United States Patent [19]
Engeler et al.

[11] Patent Number: 5,111,695
[45] Date of Patent: May 12, 1992

[54] DYNAMIC PHASE FOCUS FOR COHERENT IMAGING BEAM FORMATION

[75] Inventors: William E. Engeler, Scotia; Matthew O'Donnell, Schenectady; John T. Pedicone, Schenectady; John J. Bloomer, Schenectady, all of N.Y.

[73] Assignee: General Electric Company, Schenectady, N.Y.

[21] Appl. No.: 551,093

[22] Filed: Jul. 11, 1990

[51] Int. Cl.⁵ .............................................. G01N 29/00
[52] U.S. Cl. ................................. 73/626; 128/661.01
[58] Field of Search ................. 73/627, 626, 625, 620, 73/596; 128/661.01; 364/413.13

[56] References Cited

U.S. PATENT DOCUMENTS

| | | | |
|---|---|---|---|
| 4,796,236 | 1/1989 | Welles et al. | 128/661.01 |
| 4,835,689 | 5/1989 | O'Donnell et al. | 364/413.13 |
| 4,886,069 | 12/1989 | O'Donnell et al. | 128/661.01 |
| 5,005,419 | 4/1991 | O'Donnell et al. | 73/626 |

Primary Examiner—Hezron E. Williams
Assistant Examiner—Louis M. Arana
Attorney, Agent, or Firm—Marilyn Glaubensklee; James C. Davis, Jr.; Paul R. Webb, II

[57] ABSTRACT

A method for dynamic focus of received energy, in a vibratory energy imaging system, into a beam in which contribution from transducers in an array of N such transducers, are progressively enabled to contribute to beam focussing dependent upon distance between a particular j-th transducer (where $1 \leq j \leq N$) is responsive to the depth, or range R, of the focal point at any instant of time; the initial steering angle $\theta$, with respect to the array normal, is used in conjunction with a range clock, to determine the time when each off-normal transducer channel is enabled to add to the beam (dynamic apodization) and to finely adjust the channel time delay to properly focus the beam after the enablement of the channel.

18 Claims, 3 Drawing Sheets

DYNAMIC PHASE FOCUS FOR COHERENT IMAGING BEAM FORMATION

BACKGROUND OF THE INVENTION

The present invention relates to coherent imaging systems using vibratory energy, such as ultrasonic or electromagnetic waves, and more particularly to a novel method and novel apparatus for providing dynamic focussing of the coherent imaging beam during reception.

It is well known that the formation of a vibratory energy beam in coherent imaging systems, such as ultrasound or electromagnetic imaging systems and the like, forms a reception beam by utilization of precision time delay of the signals received by each transducer channel of a transducer array. This beamforming process is generally separated into two parts: the steering function and the focussing function. The steering function uses a first portion of the beamforming time delay to provide that time delay necessary to steer the beam in a given direction θ, with respect to a line normal to the faceplane of the array. The second time delay, which is itself time dependent, is the time delay necessary to maintain accurate focus during travel of the imaging energy pulse through the sample (e.g. the human body being imaged). While it is well known to provide method and apparatus for fully digital beam formation in a phased array coherent imaging system, such as described and claimed in U.S. Pat. No. 4,839,652, issued Jun. 13, 1989, assigned to the assignee of the present invention and incorporated herein in its entirety by reference, it is highly desirable to provide simplified apparatus and methods for computing and generating the time delay variations which are necessary for dynamic focus in such a system.

BRIEF SUMMARY OF THE INVENTION

In accordance with the invention, a method for dynamic focus of received energy, in a vibratory energy imaging system, into a beam in which contribution from transducers in an array of N such transducers, are progressively enabled to contribute to beam focussing dependent upon distance between a particular j-th transducer (where $1 \leq j \leq N$) is responsive to the depth, or range R, of the focal point at any instant of time; the initial steering angle θ, with respect to the array normal, is used in conjunction with a range clock, to determine the time when each off-normal transducer channel is enabled to add to the beam (dynamic apodization) and to thereafter finely adjust the channel time delay to properly focus the beam after the enablement of the channel.

In accordance with the invention, our novel method is carried out by apparatus with means for counting range control clock signals, responsive to the initial steering angle θ; and a logic means for issuing fine time delay adjustment signals (as phase rotational signal Δφ) responsive to a phase control algorithm.

The foregoing invention will be described with particular emphasis to one energy form, e.g. ultrasonic mechanical vibrations, in a presently preferred embodiment; it should be understood that this energy form is exemplary and not delimiting.

Accordingly, it is an object of the present invention to provide a novel method for generating dynamic phase focus time delays in a vibratory energy imaging system, and for providing novel apparatus utilizing the foregoing novel method.

These and other objects of the present invention will become apparent to those skilled in the art upon reading of the following detailed description of the invention, when considered in conjunction with the appended drawings.

DETAILED DESCRIPTION OF A PRESENTLY PREFERRED EMBODIMENT OF OUR INVENTION

Figure 1:
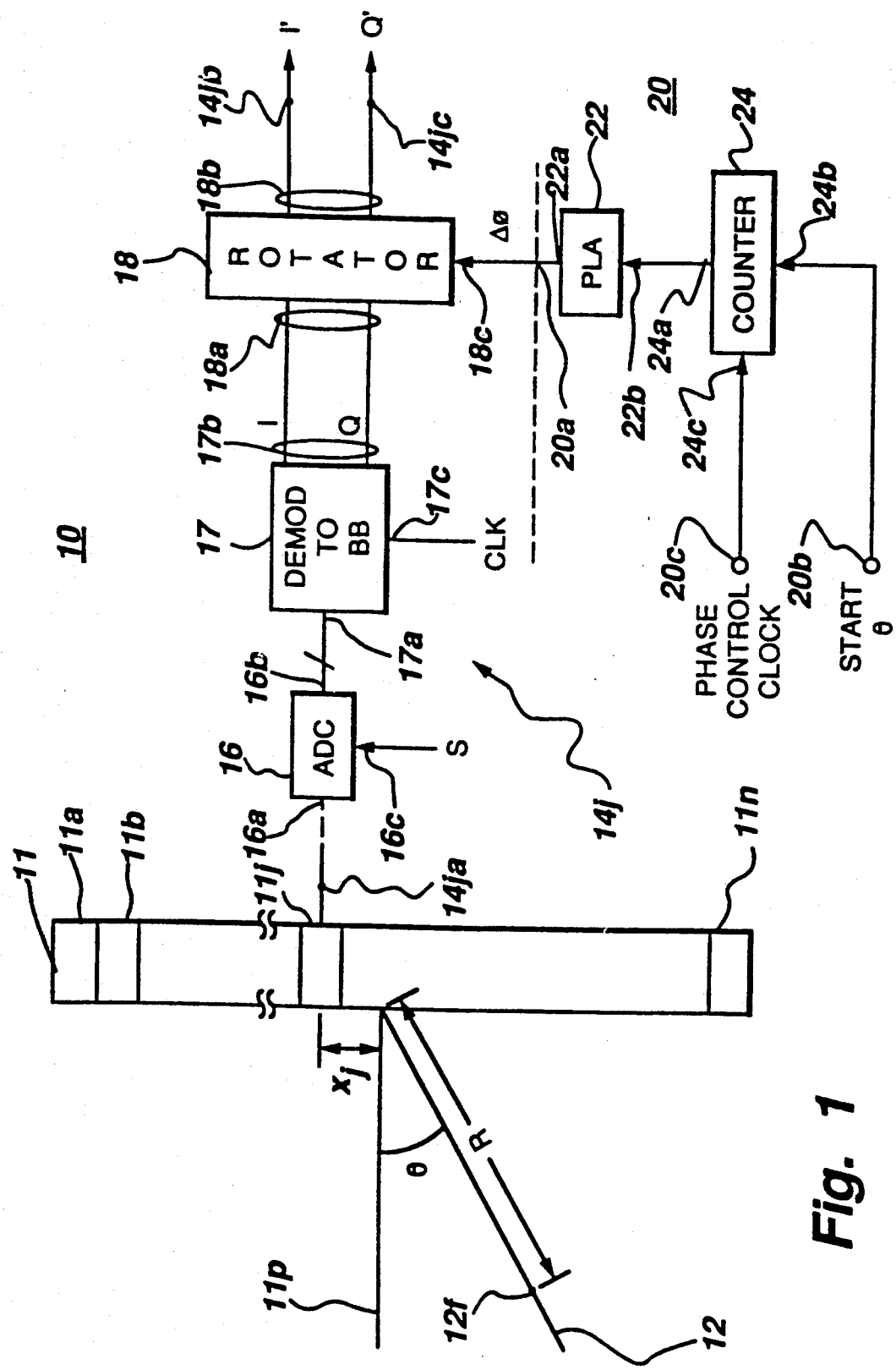
FIG. 1 is a schematic block diagram of the front end of a vibratory energy (ultrasonic) imaging system in accordance with the principles of the present invention.

Referring initially to FIG. 1, a phased-array sector scanning (PASS) vibratory energy (e.g. ultrasonic) imaging system 10 has a front-end transducer array 11 which is comprised of a plurality N of individual transducers 11a, 11b, . . . , 11j, . . . 11n. Each transducer operates, in a transmission condition, to convert electrical energy of a radio-frequency signal to a desired (e.g. ultrasonic mechanical) form of vibratory energy, and then, in a reception condition, operates to convert reflected (ultrasonic mechanical) vibrations to a received RF analog electrical signal, in manner well known to the art. Other forms of energy, such as sonic, electromagnetic energy (light, radio, etc.) and the like, can be equally as well utilized. The array is utilized for imaging a spatial location 12f, which is at a range distance R along the line 12 at some steering angle θ with respect to a line 11p normal to the plane of array 11. The vibratory (ultrasonic) signal reflected from point 12f has a wavefront approaching the plane of array 11 at angle θ; the received vibratory (ultrasonic) signal at any particular one of the transducers, e.g. the j-th transducer 11j (where j is an integer satisfying the condition $1 \leq j \leq N$) produces an analog electric signal which is made available at the input 14ja of a j-th channel portion 14j of the system. Within each of the N substantial identical channel portions 14 may be some transmit-receive (T/R) switching means, a time-gain-control (TGC) amplifier means, and the like, all not shown but well known to the art. The received analog signal in each channel is applied to an analog input 16a of an analog-to-digital converter (ADC) means 16, to provide a multi-bit digital signal at an output port 16b, for each conversion which is provided responsive to receipt of a sampling S strobe signal at a conversion control input 16c. The multi-bit data word from output 16b is provided to an input 17a of a demodulator means 17, which demodulates the data to baseband and provides a pair of quadrature-phased signals at a modulator output port 17b, responsive to clock CLK pulses at an input 17c. The filtered in-phase I baseband data word and the quadrature-phase Q baseband data word are individually provided to inputs 18a of a Cordic rotator means 18 which causes fine phase rotation (and therefore fine time delay adjustment) of the two signals to provide a finely-adjusted in-phase data word I' and a finely-adjusted quadrature-phase data word Q' at outputs 18b, and thus at channel front end outputs 14jb/14jc, responsive to the fine rotation $\Delta\phi$ information provided at a rotator input 18c. Cordic rotator means 18 can be the cordic complex multiplier described and claimed in U.S. Pat. No. 4,896,287, assigned to the assignee of the present invention and also incorporated herein in its entirety by reference.

In accordance with a first principle of the present invention, the fine phase control data $\Delta\phi$ is provided at an output 20a of a control section 20, which receives steering angle $\theta$ information at a first input 20b and receives a phase control clock signal at a second input 20c. The phase control $\Delta\phi$ information is provided at the output 22a of a programmable logic assembly (PLA) means 22, responsive to stored data, related to channel number J, and dependent on angle clock information provided at the input 22b thereof. This information is provided at the output 24a of a counter means 24, receiving the steering angle $\theta$ information at a first input 24b and the phase control clock $C_{fc}$ information at another input 24c.

The delay time in the j-th channel, with a transducer 11j having a center offset from the array centerline 11p by a distance $x_j$, for focussing the reception beam at a range R and at a steering angle $\theta$, has a delay difference, from the central transducer element, given by:

$$t_{d,j} = (-x_j/V_s)\sin\theta - (x_j^2/2RV_s)\cos^2\theta \quad (1)$$

where $V_s$ is the velocity of sound in the sample. The first term $(-x_j/V_s)\sin\theta$ is the channel time delay necessary to steer the beam to the angle $\theta$, while the second term is the channel dynamic focussing term of interest in the present invention. Thus, the time delay of each channel J is provided by first specifying the time, or, more specifically, the number of cycles of a master clock, at which the baseband demodulation starts and also by specifying the rotation angle $\Delta\phi$ through which the resulting in-phase I signal and quadrature-phase Q signal are to be phase rotated to provide a fine time delay adjustment. This recognizes that the total delay time $t_{d,j}$ is approximately equal to the product of a time delay index $k_{d,j}$ and a time increment $\Delta t_0$, or $$t_{d,j} = k_{d,j}\Delta t_0 \quad (2)$$

But, as $\Delta t_0 = \Delta\phi/\omega_0$, equation (1) and the time delay index $(k_{d,j} = t_{d,j}/\Delta t_0)$ can be rewritten to yield the equation $$k_{d,j} = (-x_j/V_s\Delta t_0)\sin\theta - (x_j^2/2V_sR\Delta t_0)\cos^2\theta. \quad (3)$$

Now, we define a range clock index n, such that $2R = nV_s\tau_0$, where $\tau_0$ is the range clock time interval. Now defining a first constant $S_0 = (-x_j\sin\theta/V_s\Delta t_0)$ and a second constant $C = (x_j^2\cos^2\theta/V_s^2\tau_0\Delta t_0)$, and knowing that the channel is open for use, in the dynamic focussing situation, only if $\partial k_{d,j}/\partial n = -C/n^2 = -1$, and that when $n = n_0$, the constant C is itself equal to $n_0^2$, the time delay index equation becomes $$k_{d,j} = (S_0 + C/n) \quad (4a)$$
or
$$k_{d,j} = (S_0 + n_0^2/n) \quad (4b)$$

where $n_0$ is the starting range clock index. Thus, it will be seen that focussing time delay corrections are to be made only by adjusting the phase rotation angle $\Delta\phi$ during the time where the vibratory energy pulse is propagating through the sample. This may conveniently be done by sequencing through a set of previously specified equally-spaced rotational angles, which sequencing is accomplished with the combination of digital counter 24, the PLA control means 22 and Cordic rotator 18. This apparatus provides the fine phase control/time delay adjustment necessary to provide $\Delta\phi$ phase adjustment proportional to the dynamic focus time delay index $(n_0^2/n)$.

Figure 2:
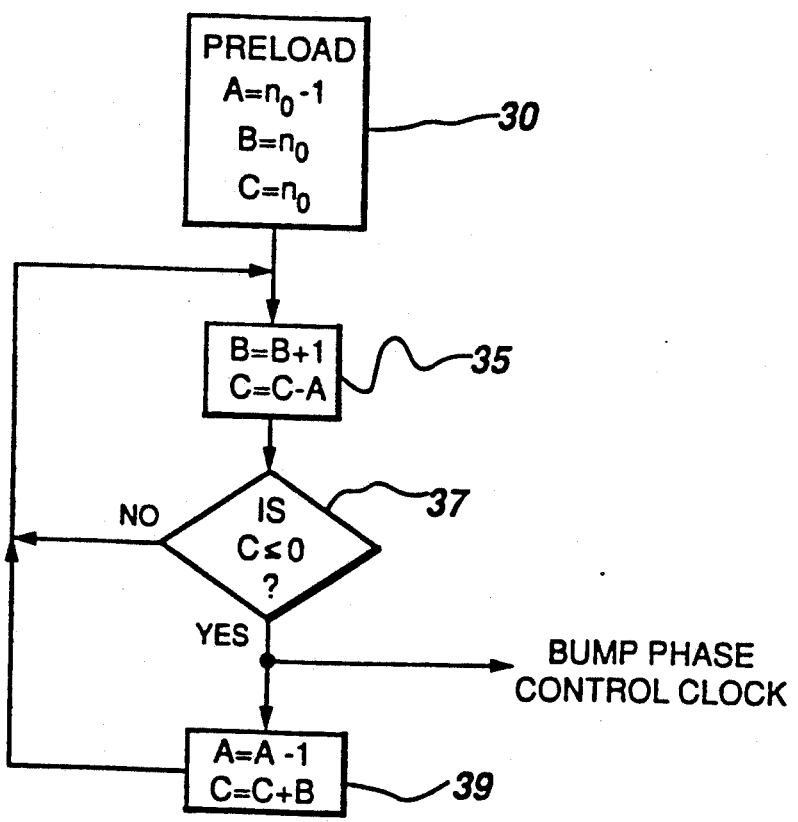
FIG. 2 is a logic flow diagram of one presently preferred embodiment of a procedure for implementation of the method of the present invention.
Figure 3:
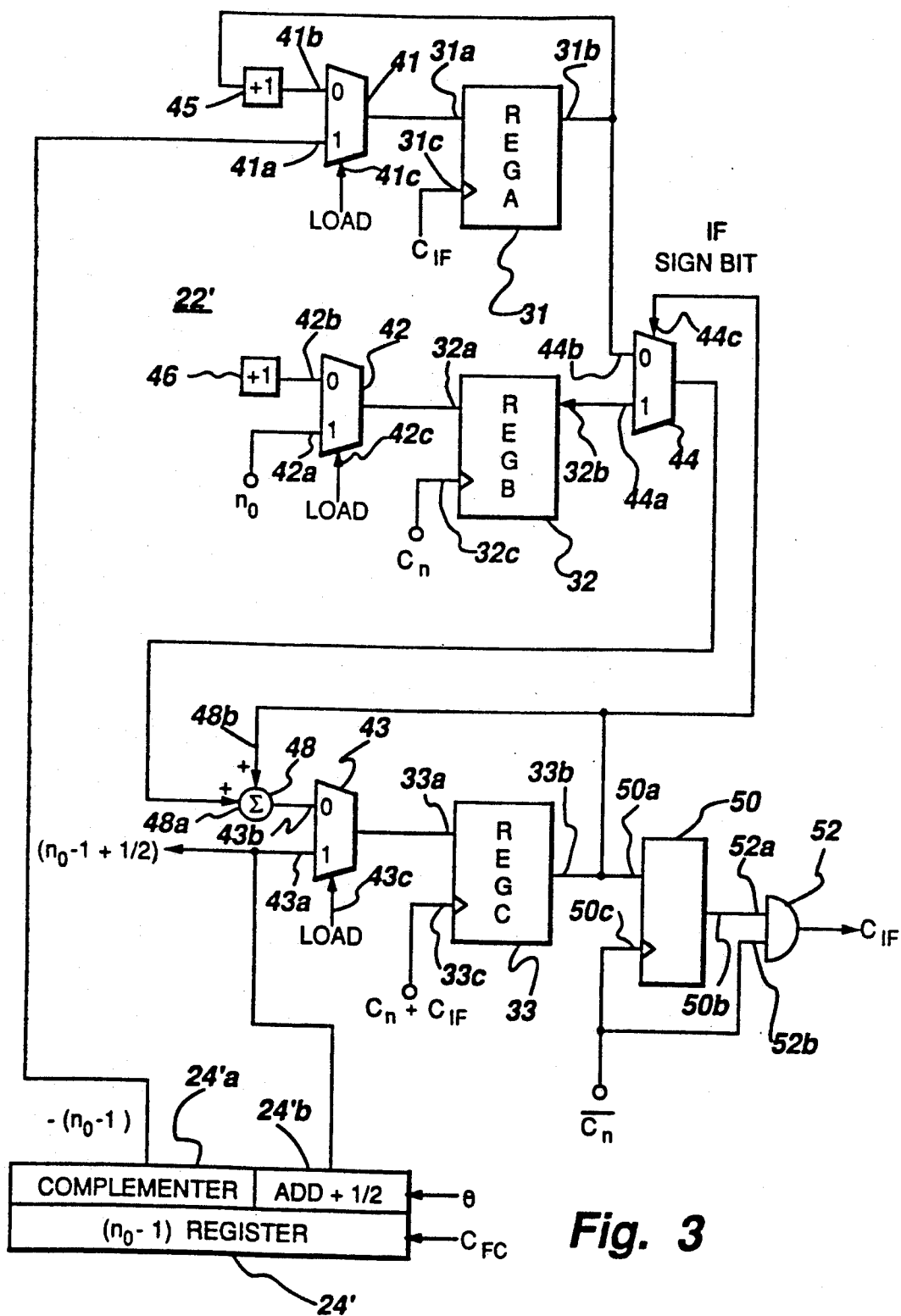
FIG. 3 is a schematic block diagram of one presently preferred hard-wired digital logic circuit for carrying out the method diagrammed in FIG. 2.

Referring now to all of FIGS. 1-3, counter means 24 is preloaded with the steering angle $\theta$ data and is then sequenced through its range responsive to the cycles of a phase control clock signal $C_{fc}$. The present angle code information is sent from the counter 24 to the PLA input 22b, which in turn specifies the $\Delta\phi$ control signal utilized by the Cordic rotator so that the I/Q signals total rotation is advanced by a specific angle each time the phase control clock cycles. Thus, the delay count that is supplied at the start of each beam includes not only those clock counts necessary for $\theta$ steering, but also includes the counts necessary to focus the beam at an intermediate distance $R_{mid}$, which midrange is selected, for each channel, to minimize the total delay error. We have found that steps at an angle of $2\pi/32$ is sufficiently fine to provide adequate focussing, while still maintaining reasonable clock rates for apertures corresponding to a f2 lens. Therefore, the frequency control clock can have, at most, the same frequency as the system sample rate; in the extreme case, the focus will change by one step for each sample. The time delay index equation can then be rewritten as $$k_{d,j} = K_0 - n_0^2(1/n_0 - 1/n_s) \quad (4c)$$

where $K_0$ is the value of $k_{d,j}$ at $n = n_0$. Therefore, only that j-th channel which meets the range clock criteria is turned on when the count equals count $n_0$. At all later times, the phase-advance clock is cycled whenever $k_{d,j}$ is increased by one count, i.e. whenever there is an integer solution of the foregoing equation. If the occurrence of such integer solutions is counted with an index m, the number of counts $\Delta(m)$, of the range clock, between integer solutions, is given by: $\Delta(m) = n/(n_0 - 1 - m)$. This equation is solved utilizing the data flow of FIG. 2.

Quantities A, B and C are integer counts which are preloaded into registers (such as registers 31, 32 and 33, respectively, in the implementation 22' shown in FIG. 3). The preloaded values are $A = (n_0 - 1)$, $B = n_0$ and $C = n_0$, respectively. After preloaded in step 30, step 35 is entered and, at each cycle of the range clock, the quantity B is incremented by one (i.e. $B = B + 1$) and quantity C is decreased by the value of quantity A (i.e. $C = C - A$). When the new value of quantity C is less than or equal to zero, as checked in a comparison step 37, a phase control clock cycle request is issued and the phase control clock $C_{fc}$ is "bumped". This advances the phase rotation of the channel by one step and increases the effective channel delay. The value of quantity A is decreased by one and the value of C is increased by the current value of quantity B, in step 39, and the steps are then subsequently repeated on subsequent range clock cycles. Conversely, if the conditional quantity C test in step 37 is not met, no further action takes place until the next range clock cycle, when step 35 is again entered, prior to step 37 testing.

Referring now to FIG. 3, the foregoing algorithm is implemented with a hardware means 22' operating in conjunction with counter 24. The three registers 31-33 store the A, B and C data values as two's-complement integer numbers. For convenience, the value of quantity A is stored is its negative, to allow the value to be incremented, rather than decremented, so that a single adder means 48 can be utilized in the quantity C data loop to both increase quantity C by A and to increase quantity C by quantity B, as required by the algorithm. It will be seen that all of registers 31-33 are preloaded with their initial values, as derived from the value of initial range count $n_0$, stored as the quantity $(n_0-1)$ stored in register 24'. This quantity is complemented, in a complementor portion 24'a, to provide the negative quantity A value $-(n_0-1)$. Adder portion 24'b effectively extends the C register by one bit, and initiates that register with the value $n_0-0.5$, to allow the conditional test on quantity C (step 37 of FIG. 2) to be performed by a simple logic gate reading the sign bit of register 33. Loading is accomplished via one of three multiplexer (MUX) means 41, 42 or 43, each having its output connected to the data input 31a, 32a or 33a of the associated register means, and having its "one"-selected input receiving the appropriate quantity data. The quantity A data at the first register output 31b appears at a "zero"-select input 44b of a fourth MUX means 44, and is also incremented by a value of +1, in an incrementor means 45, before being applied to the zero-select input 41b of the first MUX means 41. The zero-select input 42a of the second MUX means 42 receives a constant +1 data from means 46. The quantity B data at register output 32b is applied to the one-select input 44a of the fourth MUX means 44. The output of that MUX means 44 is applied to a first input 48a of a summation means 48, having its output applied to the zero-selected input 43b of the third MUX means 43. All of the MUX means 41, 42 and 43 have their selection control inputs 41c, 42c, and 43c commonly receiving a load signal at a time sufficient for preloading the information in step 30 (of FIG. 2). The output 33b of the quantity C register is connected to the fourth MUX means select input 44c and also to a second input 48b of the summation means 48. Output 33b is also connected to the data input 50a of a register 50. The register output is coupled to one input 52a of a two-input AND gate 52, receiving the inversion of the range clock $C_n$ at a remaining input 52b (this inverted clock is utilized at the clock input 50c of the register, while the non-inverted range clock $C_n$ is applied to the register B clocking input 32c). The output of gate 52 is a IF clock $C_{IF}$, which is wire-OR'd with the n clock to provide the register C clock input 33c signal. The $C_{IF}$ signal is applied to the register A clock input 31c. Thus, the B and C registers 32 and 33 are clocked by the range clock $C_n$ and perform the first part of the algorithm. If the test on the register C sign bit is successful, a second intermediate cycle takes place, responsive to the $C_{IF}$ clock signal being issued. This second intermediate cycle issues the phase control clock $C_{fc}$ while performing the lower half of the algorithm. This sequence continues throughout the beam time interval.

While several presently preferred embodiments of our novel invention have been described in detail herein, many modifications and variations will now become apparent to those skilled in the art. It is our intent, therefore, to be limited only by the scope of the appending claims and not by the specific details and instrumentalities presented by way of explanation herein.

What we claim is:

1. A method for dynamic focus of received energy, in a vibratory energy imaging system, into a beam in which contribution from each transducer in an array of N such transducers, is progressively enabled dependent upon distance $x_j$ between a particular j-th transducer (where $1 \leq j \leq N$) and an array midpoint, responsive to a range R of a focal point at any instant of time and an initial steering angle q, with respect to the array normal, comprising the steps of:
   separately sampling for each j-th transducer on a respective channel, a stream of digital baseband data words, each individually delayed by a selected channel time delay interval, which may be different for each channel, the delay being responsive to the predetermined range R and angle q;
   generating a range clock signal at the start of beam formation;
   counting the range clock signal to determine the time when each j-th off-normal transducer channel is enabled to add to the beam; and
   thereafter finely adjusting the channel time delay to properly focus the beam after the enablement of the channel.

2. The method of claim 1, wherein the range clock signal has an index n determined by $n = 2R/V_s\tau_0$, where $V_s$ is the velocity of the beam energy in the sample and the range clock signal has a time interval $\tau_0$; and the channel time delay is adjusted proportional to $n_0/n$, where $n_0$ is the starting value of range clock index n.

3. The method of claim 2, wherein the range control index is responsive to a count of a phase control clock signal.

4. The method of claim 2, wherein the signal is generated by: presetting first, second and third quantities A, B and C to function of the starting index $n_0$; modifying at least quantity C by quantity A; and bumping the phase control clock if the resulting quantity C is then of magnitude not greater than zero.

5. The method of claim 4, further comprising the steps of: incrementing the quantity B when the quantity C was decremented; decrementing the quantity A after each phase control clock bump; incrementing the quantity C by the quantity B whenever the quantity A is decremented; and returning to the step of modifying the quantity C to determine if another phase control clock bump is required.

6. The method of claim 4, wherein if the quantity C is greater than zero, the sequence returns to the step of modifying the quantity C to determine if another phase control clock bump is required.

7. The method of claim 4, wherein quantity A is initially established as $(n_0-1)$.

8. The method of claim 2, wherein the initial range clock count is established to focus the resulting beam at a distance in the middle of the beam range.

9. The method of claim 8, wherein the total channel time delay $k_{d,j}$ is then selected according to $k_{d,j} = K_O + n_O^2(1/n_O - 1/n)$, wherein $K_0$ is the value of $k_{d,j}$ at $n = n_0$.

10. The method of claim 9, wherein the control clock has a maximum frequency not greater than that frequency at which the channel transducer output is sampled.

11. Apparatus for use in a vibratory energy imaging system for dynamically focusing received energy into a beam in which contribution from each transducer in an array of N such transducers, is progressively enabled dependent upon distance $x_j$ between a particular j-th transducer (where $1 \leq j \leq N$) and an array midpoint, responsive to a range R of a focal point at any instant of time and an initial steering angle q, with respect to the array normal, comprising:

means for separately sampling for each j-th transducer on a respective channel, a stream of digital baseband data words, each individually delayed by a selected channel time delay interval, which may be different for each different channel, the delay being responsive to the predetermined range R and angle q;

means for generating a range clock signal at the start of formation;

means for counting the range clock signal to determine the time when each j-th off-normal transducer channel is enabled to add to the beam; and means within each j-th channel for finely adjusting the channel time delay to properly focus the beam after the enablement of the channel.

12. The apparatus of claim 11, wherein said adjusting means includes: means for rotating each of the digital baseband data words by an angle $\Delta\Phi$ responsive to a control signal; and means for generating the control signal responsive to a starting angle $\theta$ and a phase control clock signal.

13. The apparatus of claim 12, wherein said phase control clock signal is generated by: means for storing first, second and third quantities A, B and C; means for loading an initial range index $n_0$ into said storage means; means for decrementing the first quantity A and the third quantity C; means for incrementing the second quantity B and the third quantity C; and means for comparing the third quantity C to a selected number and for causing the phase control clock signal to be bumped if quantity C has a selected comparison to a selected number.

14. The apparatus of claim 13, wherein said storing means is a plurality of storage registers and said incrementing means is an adder.

15. The apparatus of claim 14, wherein quantity A is stored as the complement of the range index $n_0$, to facilitate decrementation by incrementation of the complemented quantity.

16. The apparatus of claim 12, wherein said rotating means is a CORDIC rotator.

17. The apparatus of claim 16, wherein the rotator operates upon a pair of quadrature-phased data words.

18. The apparatus of claim 12, wherein said adjusting means includes means for counting the phase control clock signals, commencing at a count established by the steering angle $\theta$; and PLA means for converting the count in said counting means to an adjustment control signal.

* * * * *